(12) United States Patent
Ornella et al.

(10) Patent No.: US 10,363,934 B2
(45) Date of Patent: Jul. 30, 2019

(54) APPARATUS AND METHOD FOR STARTING AN ENGINE USING A HYDRAULIC HYBRID DRIVETRAIN

(71) Applicant: DANA ITALIA SPA, Arco (IT)

(72) Inventors: Giulio Ornella, Arco (IT); Fabrizio Zendri, Rovereto (IT)

(73) Assignee: Dana Italia S.R.L., Arco (IT)

( * ) Notice: Subject to any disclaimer, the term of this patent is extended or adjusted under 35 U.S.C. 154(b) by 248 days.

(21) Appl. No.: 15/127,434

(22) PCT Filed: Feb. 3, 2015

(86) PCT No.: PCT/EP2015/052217
§ 371 (c)(1),
(2) Date: Sep. 20, 2016

(87) PCT Pub. No.: WO2015/144349
PCT Pub. Date: Oct. 1, 2015

(65) Prior Publication Data
US 2018/0170385 A1 Jun. 21, 2018

Related U.S. Application Data

(60) Provisional application No. 61/972,041, filed on Mar. 28, 2014.

(51) Int. Cl.
*B60K 6/12* (2006.01)
*B60W 30/18* (2012.01)
(Continued)

(52) U.S. Cl.
CPC ......... *B60W 30/18018* (2013.01); *B60K 6/12* (2013.01); *B60W 20/40* (2013.01);
(Continued)

(58) Field of Classification Search
CPC ............... B60K 6/12; B60K 2006/126; B60W 30/18018; B60W 20/40; F16H 61/4096;
(Continued)

(56) References Cited

U.S. PATENT DOCUMENTS 7,146,266 B2 * 12/2006 Teslak ...................... B60K 6/12
701/69
8,646,565 B2 * 2/2014 Gray, Jr. .................. B60K 6/12
180/305
(Continued)

FOREIGN PATENT DOCUMENTS

DE 102005060995 A1 6/2007
DE 102012208691 A1 11/2013
(Continued)

OTHER PUBLICATIONS

International Search Report and Written Opinion for Application No. PCT/EP2015/052217, dated Aug. 7, 2015.
(Continued)

*Primary Examiner* — James A Shriver, II
*Assistant Examiner* — Steve Clemmons
(74) *Attorney, Agent, or Firm* — Marshall & Melhorn, LLC

(57) ABSTRACT

A series hydraulic hybrid driveline for a vehicle, having a hydraulic circuit with a first hydraulic displacement unit in fluid communication with a second hydraulic displacement unit, the first hydraulic displacement unit having a variable hydraulic displacement and the first hydraulic displacement unit being drivingly engaged with an internal combustion engine. A hydraulic accumulator assembly selectively fluidly connected to the hydraulic circuit, the hydraulic accumulator assembly having a high pressure hydraulic accumulator and a low pressure hydraulic accumulator. And a hydraulic actuator adapted to control the hydraulic displace-
(Continued)

ment of the first hydraulic displacement unit, the hydraulic actuator being in fluid communication with the hydraulic accumulator assembly and/or with the hydraulic circuit. A method of shutting down an engine of a series hydraulic hybrid driveline and of re-starting the engine of a series hydraulic hybrid driveline using energy stored in a hydraulic accumulator assembly is also described.

7 Claims, 9 Drawing Sheets

(51) Int. Cl.
| | |
|---|---|
| *F16H 61/4096* | (2010.01) |
| *B60W 20/40* | (2016.01) |
| *F16H 61/4061* | (2010.01) |
| *F16H 61/433* | (2010.01) |
| *F16H 61/438* | (2010.01) |
| *F16H 61/452* | (2010.01) |

(52) U.S. Cl.
CPC ..... *F16H 61/4061* (2013.01); *F16H 61/4096* (2013.01); *F16H 61/433* (2013.01); *F16H 61/438* (2013.01); *F16H 61/452* (2013.01); *B60K 2006/126* (2013.01); *B60W 2540/00* (2013.01); *B60W 2710/24* (2013.01); *Y02T 10/6208* (2013.01); *Y02T 10/6282* (2013.01)

(58) Field of Classification Search
CPC .... F16H 61/452; F16H 61/433; F16H 61/431; F16H 61/4061; F16H 61/438
See application file for complete search history.

(56) References Cited

U.S. PATENT DOCUMENTS

| | | | | |
|---|---|---|---|---|
| 9,494,222 | B2* | 11/2016 | Versteyhe | ............. B60K 17/10 |
| 9,709,046 | B2* | 7/2017 | Krittian | ..................... F02N 7/00 |
| 2005/0016166 | A1 | 1/2005 | Singh | |
| 2012/0152641 | A1 | 6/2012 | Takahashi et al. | |
| 2015/0052889 | A1* | 2/2015 | Krittian | ..................... F02N 7/00 |
| | | | | 60/596 |
| 2015/0165887 | A1* | 6/2015 | Krittian | ..................... B60K 6/12 |
| | | | | 60/414 |
| 2015/0204356 | A1* | 7/2015 | Krittian | ..................... B60K 6/12 |
| | | | | 60/414 |
| 2016/0047397 | A1* | 2/2016 | Sikorski | .................. F15B 1/024 |
| | | | | 60/416 |
| 2016/0114668 | A1* | 4/2016 | Zhang | ..................... B60K 6/12 |
| | | | | 74/732.1 |

FOREIGN PATENT DOCUMENTS

| | | |
|---|---|---|
| GB | 2415669 A | 1/2006 |
| JP | H06247293 A | 9/1994 |
| JP | 2007261578 A | 10/2007 |
| JP | 2010506800 A | 3/2010 |
| JP | 2012236498 A | 12/2012 |
| WO | 0151870 A1 | 7/2001 |

OTHER PUBLICATIONS

Japan Patent Agency, Japanese Office Action in Application No. 2016-552288, dated Jan. 22, 2019, 8 pages, Japan Patent Agency.

* cited by examiner

APPARATUS AND METHOD FOR STARTING AN ENGINE USING A HYDRAULIC HYBRID DRIVETRAIN

CROSS-REFERENCE TO RELATED APPLICATIONS

The present document claims priority from U.S. Provisional Patent Application No. 61/972,041 filed on Mar. 28, 2014, which is hereby incorporated by reference in its entirety.

BACKGROUND OF THE INVENTION

The invention primarily relates to a hydraulic hybrid drivetrain. The invention further relates to a method of shutting down an engine of a hydraulic hybrid drivetrain and to a method of starting an engine of a hydraulic hybrid drivetrain using hydraulic energy.

An important percentage of a life of a working machine consists of being placed in an idling condition, without any request from the operator. In the idling condition, the working machine is stopped and an engine of the working machine is operating at a minimal speed. In the idling condition, the engine of the working machine, which may be an internal combustion engine, could be shut off in order to reduce fuel consumption of the working machine. To re-start the engine, known working machines use an electric motor, commonly referred to as a starter, to accelerate the engine to a minimum rate that enables the fuel injection and engine firing processes. Usually, vehicles that include an automatic start-stop functionality (which is typically based on the recognition of missing input from an operator and the idling condition being present for a predetermined amount of time) are equipped with an over-sized electric starter and main battery, due to the increased amount of engine start requests during the life of the vehicle.

It is therefore an object of the present invention to design a driveline capable of providing an energy-efficient start-stop functionality. It is another object of the present invention to devise energy efficient methods of shutting down an engine and of re-starting the engine.

These objects are solved by a series hydraulic hybrid driveline, by a method of shutting down an engine of a series hydraulic hybrid driveline, and by a method of restarting an engine of a series hydraulic hybrid driveline according to the independent claims. Special embodiments are described in the dependent claims.

Thus, a series hydraulic hybrid driveline is proposed, in particular for use in an automotive vehicle, the driveline comprising:

- a hydraulic circuit comprising a first hydraulic displacement unit in fluid communication with a second hydraulic displacement unit, the first hydraulic displacement unit having a variable hydraulic displacement and the first hydraulic displacement unit being drivingly engaged with an internal combustion engine;
- a hydraulic accumulator assembly selectively fluidly connected to the hydraulic circuit, the hydraulic accumulator assembly comprising a high pressure hydraulic accumulator and a low pressure hydraulic accumulator; and
- a hydraulic actuator adapted to control the hydraulic displacement of the first hydraulic displacement unit, the hydraulic actuator being in fluid communication with the hydraulic accumulator assembly and/or with the hydraulic circuit.

As the accumulator assembly is selectively fluidly connected to the hydraulic circuit comprising the first hydraulic displacement unit and as the first hydraulic displacement unit is drivingly engaged or selectively drivingly engaged with the internal combustion engine, hydraulic energy stored in the accumulator assembly may be used to accelerate the internal combustion engine through the first hydraulic displacement unit for starting the engine. Starting the engine through the first hydraulic displacement unit typically includes displacing hydraulic fluid from the high pressure accumulator to the low pressure accumulator through the first hydraulic displacement unit, thereby driving the first hydraulic displacement unit.

Furthermore, as the hydraulic actuator is in fluid communication with the hydraulic accumulator assembly and/or with the hydraulic circuit, hydraulic energy stored in the accumulator assembly and/or in the hydraulic circuit may be transmitted to the hydraulic actuator for controlling the hydraulic displacement of the first hydraulic displacement unit and for setting the hydraulic displacement to a desired value for a starting operation or for shutting down the engine. Controlling the displacement of the first hydraulic displacement unit may include at least one of increasing and decreasing the displacement. Controlling the displacement of the first hydraulic displacement unit may further include setting the displacement to zero displacement, for example when or right before shutting down the engine and/or when or right before fluidly disconnecting the accumulator assembly from the hydraulic circuit.

The steps of using the hydraulic actuator to set the hydraulic displacement of the first hydraulic displacement unit to a desired value and of transmitting hydraulic energy stored in the accumulator assembly to the first hydraulic displacement unit for starting the engine may be carried out using no electric energy or only a minimum amount of electric energy, for example for switching one or more electrically controlled valves.

The hydraulic circuit usually comprises a first main fluid line fluidly connecting or selectively fluidly connecting a first fluid port of the first hydraulic displacement unit to a first fluid port of the second hydraulic displacement unit, and a second main fluid line fluidly connecting or selectively fluidly connecting a second fluid port of the first hydraulic displacement unit to a second fluid port of the second hydraulic displacement unit. Each of the high pressure accumulator and the low pressure accumulator may then be selectively fluidly connected to the first main fluid line and to the second main fluid line. A minimum hydraulic or hydrostatic pressure in the hydraulic circuit may be at least 10 bar or at least 20 bar.

The hydraulic actuator may include one or more actuators configured to convert hydraulic or hydrostatic energy to a mechanical force or to mechanical movement. For example, the hydraulic actuator may include but is not limited to a hydraulic piston or a hydraulic motor.

The first hydraulic displacement unit may include a hydraulic, typically hydrostatic pump. For example, the first hydraulic displacement unit may be a hydrostatic radial piston pump or a hydrostatic axial piston pump having a moveable swashplate. The hydraulic actuator may then be mechanically coupled to the swashplate for moving the swashplate and for controlling a position or a swivel angle of the swashplate.

The second hydraulic displacement unit may include a hydraulic, typically hydrostatic motor. Like the first hydraulic displacement unit, the second hydraulic displacement unit may have a variable hydraulic displacement. The second hydraulic displacement unit may be a hydrostatic radial piston motor or a hydrostatic axial piston motor having a moveable swashplate. Usually, the second hydraulic displacement unit is drivingly engaged or selectively drivingly engaged with a vehicle output. The vehicle output may include at least one of a drive shaft, a final drive, a vehicle axle and wheels, for example.

The system typically comprises an electronic control unit. The control unit may be configured to control one or more valves and/or electronic actuators for at least one of: selectively fluidly connecting the accumulator assembly to and disconnecting the accumulator assembly from the hydraulic circuit, selectively fluidly connecting/disconnecting the accumulator assembly and/or the hydraulic circuit to/from the hydraulic actuator, controlling a hydraulic pressure applied to the hydraulic actuator through the accumulator assembly and/or through the hydraulic circuit. Within the scope of this document the formulation "at least one of $x_1, \ldots, x_n$," may include any subset of $x_1, \ldots, x_n$, including the complete set. The control unit may further be configured to start the engine and to shut down the engine.

When or right before shutting down the engine, a state of charge of the accumulator assembly may be checked in order to make sure that enough hydraulic energy is stored in the accumulator assembly for re-starting the engine. To that end, the system may be equipped with one or more pressure sensors adapted to determine a state of charge of the accumulator assembly. For example, the system may comprise a first pressure sensor for determining a hydraulic pressure in the high pressure accumulator and/or a second pressure sensor for determining a hydraulic pressure in the low pressure accumulator. The state of charge of the accumulator assembly may include at least one of the hydraulic pressure in the high pressure accumulator, the hydraulic pressure in the low pressure accumulator, and a pressure difference between the hydraulic pressure in the high pressure accumulator and the hydraulic pressure in the low pressure accumulator. The control unit may be configured to control the pressure sensor(s). For example, the control unit may be configured to at least one of command the pressure sensor(s) to perform a pressure measurement, receive the result of a pressure measurement performed by the pressure sensor(s), and process the result of the pressure measurement to determine the state of charge of the accumulator assembly.

The hydraulic actuator may be in fluid communication with the hydraulic accumulator assembly and with the hydraulic circuit through a pilot pressure portion, the pilot pressure portion comprising shuttle valves adapted to select a greatest hydraulic pressure between i) a greatest hydraulic pressure in the hydraulic circuit and ii) a greatest hydraulic pressure in the hydraulic accumulator assembly. The greatest pressure selected by the shuttle valves may then be used as a pilot pressure for controlling the hydraulic actuator. For example, the greatest pressure selected by the shuttle valves may be applied or selectively applied to the hydraulic actuator for controlling the displacement of the first hydraulic displacement unit.

A shuttle valve typically includes a hollow body, such as a pipe, that has two inlets and one outlet. A blocking element may be freely moveable within the hollow body to selectively block one of the two inlets, thereby allowing a flow of hydraulic fluid between the inlet that is not blocked and the outlet. For example, when a first hydraulic pressure is applied to the first inlet and a second hydraulic pressure is applied to the second inlet, the first hydraulic pressure being larger than the second hydraulic pressure, the blocking element is pushed toward the second inlet, thereby blocking the second inlet. In this way, the first inlet is fluidly connected to the outlet and the hydraulic pressure at the outlet is equal to the first hydraulic pressure applied to the first inlet.

Optionally, a shuttle valve may be replaced by an arrangement including at least two check valves as is readily apparent to a skilled person. For example, such an arrangement may include a first check valve providing fluid communication between a first (inlet) fluid port and an outlet fluid port, and a second check valve providing fluid communication between a second (inlet) fluid port and the outlet fluid port. In this arrangement, the first check valve may be configured to allow a flow of fluid from the first fluid port to the outlet fluid port and to block a flow of fluid from the outlet fluid port to the first fluid port, and the second check valve may be configured to allow a flow of fluid from the first fluid port to the outlet fluid port and to block a flow of fluid from the outlet fluid port to the first fluid port. In this manner, the greatest of the hydraulic pressures applied to the inlet fluid ports is selected at the outlet fluid port.

The pilot pressure portion may further comprise a pressure reducing valve adapted to reduce the greatest pressure selected by the shuttle valves to a preferably constant pilot pressure. The pressure reducing valve may be fluidly connected or selectively fluidly connected to the hydraulic actuator, for example through one or more shut-off valves, for providing or for selectively providing a reduced pilot pressure to the hydraulic actuator. Limiting the pilot pressure in this manner may prevent damaging the hydraulic actuator. Furthermore, providing a constant pilot pressure to the hydraulic actuator may facilitate controlling the hydraulic actuator and, thus, controlling the hydraulic displacement of the first hydraulic displacement unit.

Specifically, the pilot pressure portion may comprise a first shuttle valve adapted to select a greater hydraulic pressure between the hydraulic pressure in the high pressure hydraulic accumulator and in the low pressure hydraulic accumulator. The pressure selected by the first shuttle valve may be applied or selectively applied to the hydraulic actuator, optionally after passing the above described pressure reducing valve. As explained above, the first shuttle valve may optionally be replaced by a set of at least two check valves.

Alternatively, the pilot pressure portion may comprise a second shuttle valve adapted to select a greater hydraulic pressure between the hydraulic pressure in the first main fluid line and in the second main fluid line. The pressure selected by the second shuttle valve may be applied or selectively applied to the hydraulic actuator, optionally after passing the above described pressure reducing valve. As explained above, the second shuttle valve may optionally be replaced by a set of at least two check valves.

Further, it is conceivable that the pilot pressure portion comprises both the above described first shuttle valve, the above described second shuttle valve and, additionally, a third shuttle valve, wherein the third shuttle valve is adapted to select a greater hydraulic pressure between the hydraulic pressure selected by the first shuttle valve and the hydraulic pressure selected by the second shuttle valve. That is, the pressure selected by the third shuttle valve is the greatest hydraulic pressure of the hydraulic pressures in the accumulators and in the hydraulic circuit. The pressure selected by this third shuttle valve may then be applied or selectively applied to the hydraulic actuator, optionally after passing the above described pressure reducing valve. Again, the third shuttle valve may optionally be replaced by a set of at least two check valves.

The proposed driveline may comprise a charge pump drivingly engaged with the internal combustion engine. The charge pump may be in fluid communication with the hydraulic actuator for providing or for selectively providing a pilot pressure to the hydraulic actuator when the internal combustion engine is driving the charge pump. The charge pump may be fed by a fluid reservoir. The fluid reservoir may be at atmospheric pressure.

The driveline may comprise a pair of isolation valves adapted to selectively fluidly isolate or disconnect the second hydraulic displacement unit from the first hydraulic displacement unit and/or to selectively fluidly isolate the second hydraulic displacement unit from the hydraulic accumulator assembly, in particular when the hydraulic accumulator assembly is fluidly connected to the hydraulic circuit. Fluidly isolating the second hydraulic displacement unit from the first hydraulic displacement unit and/or from the accumulators may be useful when starting the engine in order to disengage the vehicle output. Alternatively, the hydraulic displacement of the second hydraulic displacement unit could be set to zero or the second hydraulic displacement unit could be disengaged from the vehicle output using a clutch, for example.

Further, a method of shutting down an internal combustion engine of a series hydraulic hybrid driveline is proposed. The method may be carried out using the hydraulic hybrid driveline described above. The method comprises the steps of:
when, for a predetermined period of time, no input command is provided through at least one of one or more input devices, determining a state of charge of a hydraulic accumulator assembly; and
if the determined state of charge is below a threshold state of charge:
charging the hydraulic accumulator assembly until the state of charge of the hydraulic accumulator assembly is equal to or larger than the threshold state of charge, and then shutting down the engine;
if the determined state of charge is equal to or above the threshold state of charge:
shutting down the engine.

Preferably, the threshold state of charge is the minimum state of charge or the minimum hydraulic energy that is needed for re-starting the engine using the accumulators as explained above. The method may be carried out using the above described hydraulic control unit and pressure sensor(s). Charging the accumulators may include using the engine to drive the first hydraulic displacement unit drivingly engaged with the engine, so that the first hydraulic displacement unit displaces hydraulic fluid from the low pressure accumulator to the high pressure accumulator, thereby increasing a pressure gradient between the accumulators.

Finally, a method of starting an internal combustion engine of a series hydraulic hybrid driveline is proposed. The method may be carried out using the series hydraulic hybrid driveline described above. The method comprises at least the following steps:
fluidly connecting a high pressure hydraulic accumulator and a low pressure hydraulic accumulator to a first hydraulic displacement unit drivingly engaged with the engine; and
accelerating the internal combustion engine through the first hydraulic displacement unit by displacing hydraulic fluid from the high pressure accumulator to the low pressure accumulator through the first hydraulic displacement unit.

Fluidly connecting the high pressure accumulator and the low pressure accumulator to the first hydraulic displacement unit usually includes fluidly connecting the high pressure accumulator to a first fluid port of the first hydraulic displacement unit and fluidly connecting the low pressure accumulator to a second fluid port of the first hydraulic displacement unit, or vice versa, typically by actuating one or more valves and/or by actuating one or more electric actuators.

The method may further comprise the steps of:
fluidly connecting the high pressure hydraulic accumulator to a hydraulic actuator adapted to control the hydraulic displacement of the first hydraulic displacement unit; and
varying the hydraulic displacement of the first hydraulic displacement unit through the hydraulic actuator by displacing hydraulic fluid from the high pressure hydraulic accumulator to the hydraulic actuator.

The step of varying the hydraulic displacement of the first hydraulic displacement unit may include setting the hydraulic displacement of the first hydraulic displacement unit to a non-zero displacement before fluidly connecting the high pressure accumulator and the low pressure accumulator to the first hydraulic displacement unit.

When the ICE has been accelerated, for example when the ICE has reached an idling speed, the hydraulic actuator may be used to set the hydraulic displacement of the first hydraulic displacement unit to zero displacement so that the accumulators may subsequently be fluidly disconnected from the hydraulic circuit in a controlled manner and without causing cavitation in the first hydraulic displacement unit. Setting the hydraulic displacement of the first hydraulic displacement unit to zero may be carried out by using a charge pump drivingly engaged with the internal combustion engine and in fluid communication with the hydraulic actuator to apply a hydraulic pilot pressure to the hydraulic actuator.

The method may be initiated automatically once the state of charge of an electric energy storage device, such as a battery, falls below a threshold state of charge. The threshold state of charge may be the amount of electric charge and/or of electric energy required for fluidly connecting the high pressure hydraulic accumulator and the low pressure hydraulic accumulator to the first hydraulic displacement unit and/or for fluidly connecting the high pressure hydraulic accumulator to the hydraulic actuator, for example by actuating one or more electric valves and/or one or more electric actuators. When the engine has been started, the electric energy storage device may be recharged using a generator or an alternator drivingly engaged with the engine, for example. In this way it is ensured that enough electric energy is stored in the electric energy storage device for a subsequent start procedure. Of course, the method may alternatively be initiated by an operator, for example by actuating one or more input devices.

BRIEF DESCRIPTION OF THE DRAWINGS

A preferred embodiment of the presently proposed drivetrain and methods is described in the following detailed description and depicted in the accompanying drawing in which.

DETAILED DESCRIPTION OF THE INVENTION

Figure 1:
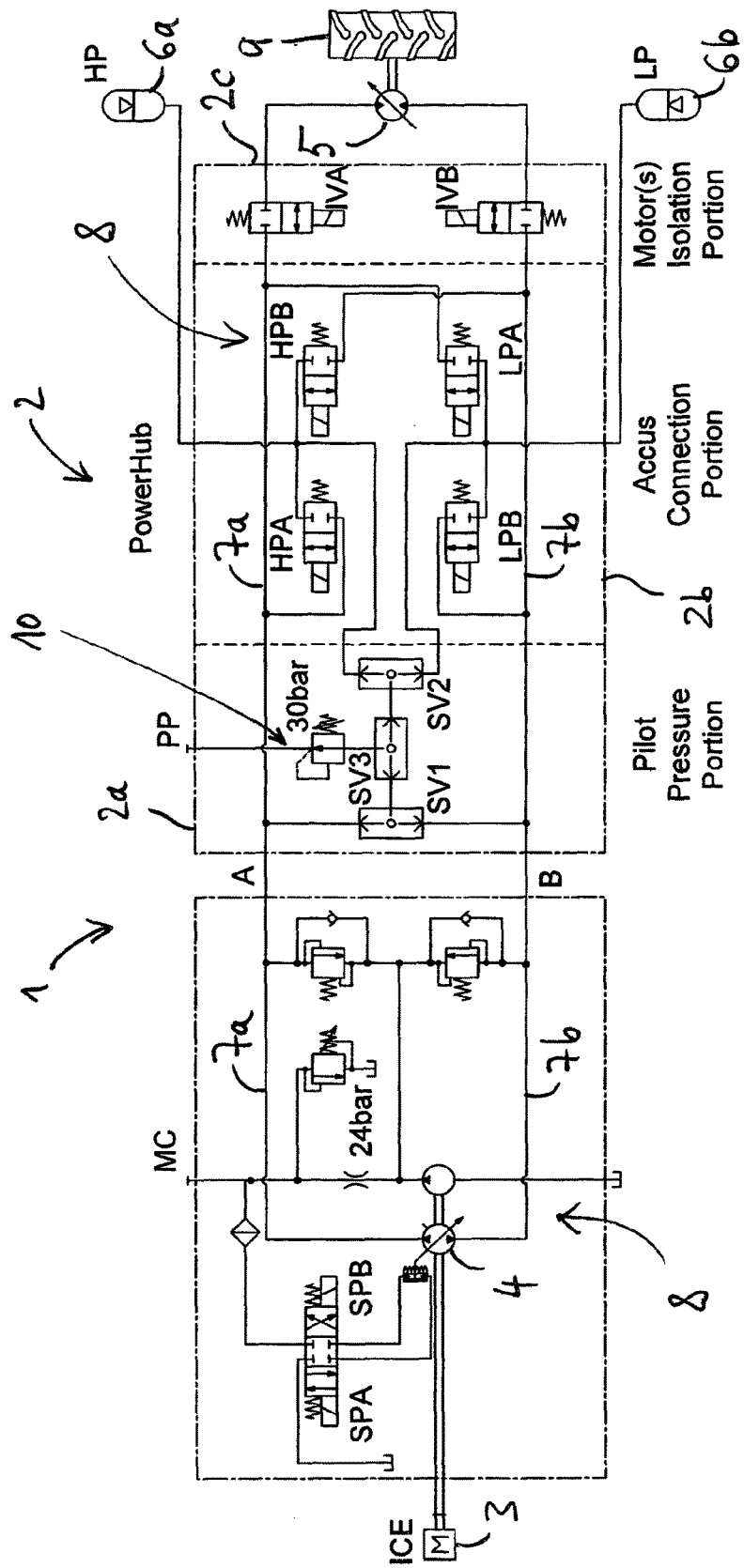
FIG. 1 shows a series hydraulic hybrid driveline including a pilot pressure port PP and a charge pump measuring port MC.

FIG. 1 schematically illustrates a series hydraulic hybrid driveline 1 including a powerhub 2. The hydraulic hybrid driveline 1 comprises an engine 3 that drives an electro-hydraulic variable displacement pump 4. The powerhub 2 is located between the pump 4 and a hydrostatic variable displacement motor 5. The powerhub 2 allows the hydraulic hybrid driveline 1 to store hydraulic energy in a pair of accumulators 6a, 6b when possible, and re-supply the hydraulic energy when needed, to save fuel or increase performance of the hydraulic hybrid driveline 1. The high pressure accumulator 6a and the low pressure accumulator 6b are configured as hydro-pneumatic bladder accumulators, for example.

The pump 4 and the motor 5 are in fluid communication through a first main fluid line 7a and a second main fluid line 7b. The first main fluid line 7a selectively fluidly connects a first fluid port of the pump 4 to a first fluid port of the motor 5 through a first isolation valve IVA. The second main fluid line 7b selectively fluidly connects a second fluid port of the pump 4 to a second fluid port of the motor 5 through a second isolation valve IVB. The pump 4, the motor 5 and the main fluid lines 7a, 7b form a hydraulic circuit 8. When the isolation valves IVA, IVB are in an open position, the hydraulic circuit 8 is closed so that hydraulic fluid may circulate in the hydraulic circuit 8. For example, when the hydraulic circuit 8 is closed, mechanical energy from the engine 3 may be transmitted through the hydraulic circuit 8 to drive a vehicle output 9 which is drivingly engaged with the motor 5. When the driveline 1 is operational, a minimum hydraulic pressure in the hydraulic circuit 8 is usually at least 10 bar or at least 20 bar.

The powerhub 2 comprises three portions: a pilot pressure portion 2a, an accumulator connection portion 2b, and a motor isolation portion 2c. The motor isolation portion 2c comprises the two isolation valves IVA, IVB, which are 2/2-way valves which are in a normally closed position. The isolation valves IVA, IVB isolate the hydrostatic variable displacement motor (or motors) 5 from a remaining portion of the hydraulic hybrid driveline 1 when the isolation valves IVA, IVB are not actuated. As a non-limiting example, the hydrostatic variable displacement motor 5 may be isolated when the engine is not running, to facilitate hydrostatic braking.

The pilot pressure portion 2a provides the powerhub 2 with a pilot pressure port PP. The pilot pressure port PP provides a pressure suitable for pilots (for example, a pressure of about 30 bar) when the vehicle is running and/or when the accumulators 6a, 6b are pressurized. The pilot pressure portion 2a comprises three shuttle valves SV1, SV2, SV3 and a pressure reducing valve 10.

The inlet ports of the first shuttle valve SV1 are fluidly connected to the first main fluid line 7a and to the second main fluid line 7b, respectively. Thus, at its outlet port the first shuttle valve SV1 selects a greater hydraulic pressure between the hydraulic pressure in the first main fluid line 7a and the hydraulic pressure in the second main fluid line 7b. The inlet ports of the second shuttle valve SV2 are fluidly connected to the high pressure accumulator 6a and to the low pressure accumulator 6b, respectively. Thus, at its outlet port the second shuttle valve SV2 selects a greater hydraulic pressure between the hydraulic pressure in the high pressure accumulator 6a and the hydraulic pressure in the low pressure accumulator 6b. The inlet ports of the third shuttle valve SV3 are fluidly connected to the outlet ports of the first shuttle valve SV1 and of the second shuttle valve SV2, respectively. Thus, at its outlet port the third shuttle valve SV3 selects a greater hydraulic pressure between the hydraulic pressure selected by the first shuttle valve SV1 and the hydraulic pressure selected by the second shuttle valve SV2. The pressure reducing valve 10 is supplied with hydraulic pressure from the third shuttle valve SV3. The pressure reducing valve 10 reduces this pressure to a pilot pressure (for example, a pressure of about 30 bar) and supplies the reduced pressure to the pilot pressure port PP.

The pilot pressure portion 2a allows pilot pressure to be supplied when the two main fluid lines 7a, 7b do not have pressure, as the pilot pressure will be supplied from either the high pressure accumulator 6a or the low pressure accumulator 6b. Typically, pressure within the two main fluid lines 7a, 7b is supplied by the electro-hydraulic variable displacement pump 4 through the operation of the engine 3. In the hydraulic hybrid driveline 1 as described herein, the engine 3 may be placed in a non-operational condition, and thus the pilot pressure portion 2a allows pilot pressure to be supplied from either the high pressure accumulator 6a or the low pressure accumulator 6b.

Typically, in the series hydraulic hybrid driveline 1, following a braking maneuver, the high pressure accumulator 6a is charged to about a maximum pressure and the low pressure accumulator 6b is relieved of pressure to about a minimum pressure. As non-limiting examples, the maximum pressure may be about 200 bar and the minimum pressure may be about 20 bar. In the event that the operator of the hydraulic hybrid driveline 1 is not providing any commands to the hydraulic hybrid driveline 1, the engine 3 may be placed in the non-operational condition.

Figure 2:
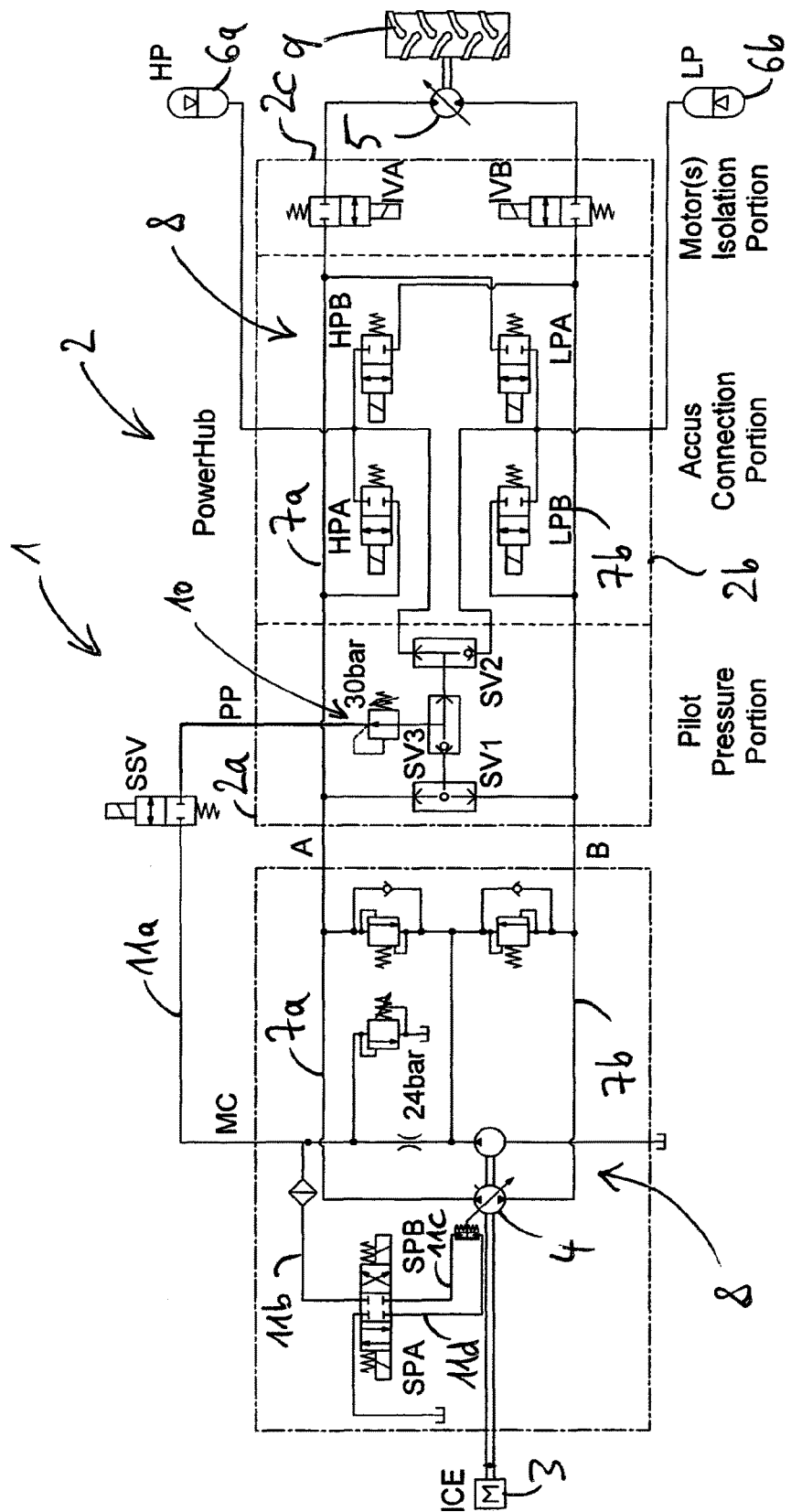
FIG. 2 shows the series hydraulic hybrid driveline of FIG. 1, wherein the pilot pressure port PP and the charge pump measuring port MC are in fluid communication through a start-stop valve SSV.

FIG. 2 schematically illustrates the hydraulic hybrid driveline 1 when the engine 3 is placed in the non-operational condition. Here and in the following, recurring features are designated with the same reference signs. Specific details regarding the logic used in determining when and how to place the engine 3 in the non-operational condition or return the engine 3 to an operational condition are described hereinbelow. The engine 3 may be placed in the non-operational condition automatically by a controller (not shown) in one of two ways.

In a first way, the controller instructs an engine control unit (not shown) using a specific command that inhibits a fuel injection process. In a second way, electronic circuitry between the engine control unit and the engine 3 may be modified to allow control over the fuel injection process, allowing the fuel injection process to be inhibited or enabled on request.

The hydraulic hybrid driveline 1 illustrated in FIG. 2 includes a start-stop valve SSV which provides fluid communication between the pilot pressure port PP of the powerhub 2 and a charge pump pressure measuring port MC. In FIG. 2, the valve SSV is in a closed position in which no hydraulic fluid may flow through the valve SW. That is, in FIG. 2 the valve SSV fluidly disconnects the pilot pressure port PP from the charge pump measuring port MC. The charge pump pressure measuring port MC is a typical feature of hydraulic variable displacement pumps.

FIG. 2 further illustrates the following operational conditions:

The engine 3 is placed in the non-operational state and a moveable swashplate of the hydrostatic pump 4 is automatically swiveled into a zero displacement position, resulting in no hydraulic pressure being The hydrostatic motor 5, which is normally fluidly connected to the main fluid lines 7a, 7b, is fluidly disconnected from the rest of the components of the powerhub 2 by closing the isolation valves IVA, IVB to facilitate the braking maneuver.

The high pressure accumulator 6a is charged or pressurized to about a maximum pressure and the low pressure accumulator 7b is relieved of pressure to about a minimum pressure.

The pilot pressure portion 2a selects the hydraulic pressure from the high pressure accumulator 6a and, through the pressure reducing valve 10, reduces it to the pilot pressure.

In the conditions illustrated in FIG. 2, the swashplate of the hydrostatic pump 4 cannot be commanded to swivel in any direction, as the pilot lines 11a-d of the hydrostatic pump 4 are not fluidly connected to any pressurized lines. Through the use of the start-stop valve SSV, however, the pilot lines 11a-d of the hydrostatic pump 4 can be provided with pilot pressure.

Figure 3:
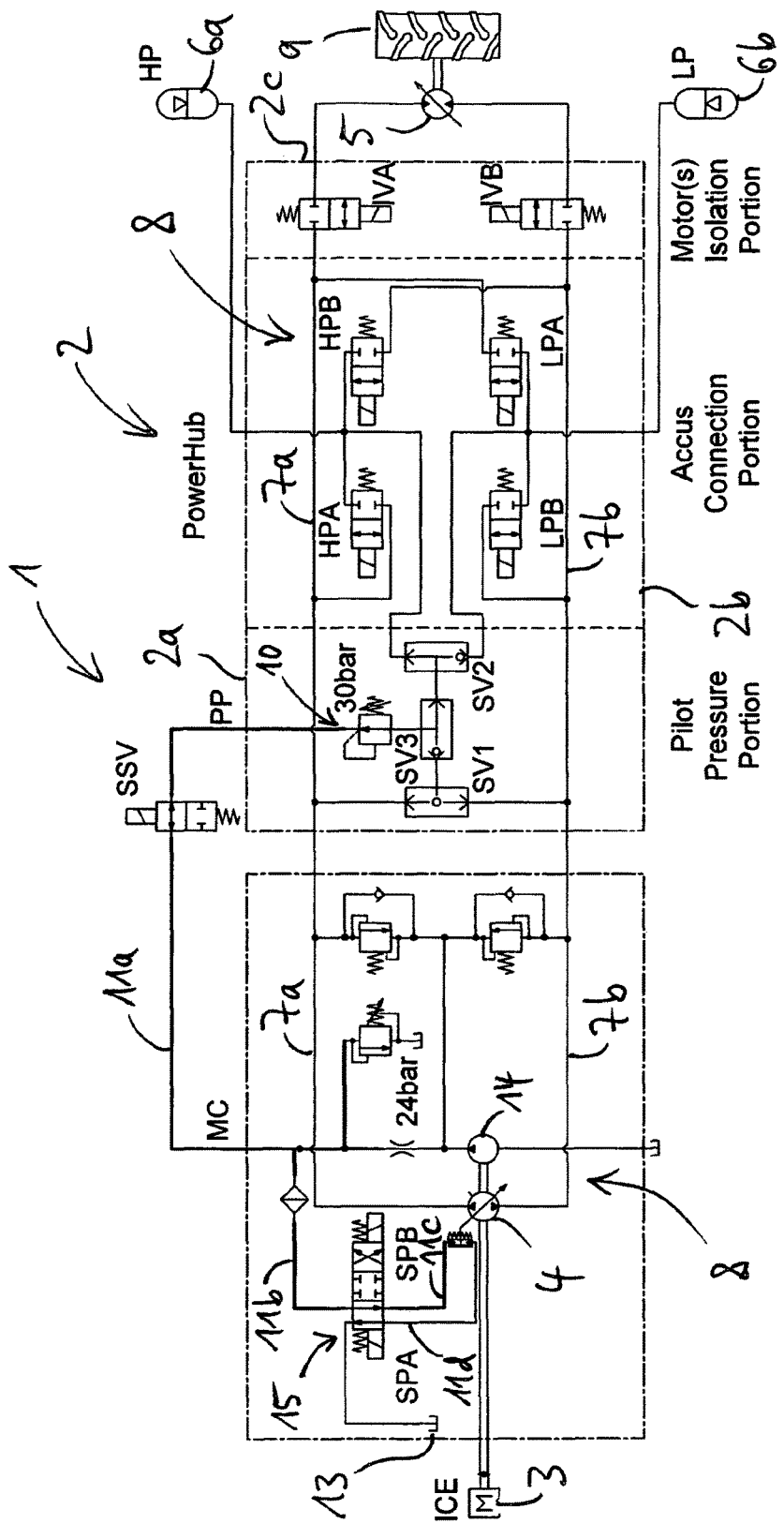
FIG. 3 shows the series hydraulic hybrid driveline of FIG. 2, wherein the start-stop valve SSV is opened to fluidly connect a hydraulic accumulator assembly to a hydraulic actuator.

The hydraulic hybrid driveline 1 illustrated in FIG. 3 shows the pilot lines 11a-d of the hydrostatic pump 4 fluidly connected to the pilot pressure port PP through the start-stop valve SSV. As shown in FIG. 3, a hydraulic actuator 12 mechanically coupled to the swashplate of the pump 4 is supplied with the pilot pressure required to swivel out the swashplate of the hydrostatic pump 4, thereby increasing the hydraulic displacement of the pump 4 to a desired non-zero value.

The hydraulic actuator 12 includes a hydraulic piston which may be moved by changing an amount of hydraulic fluid and/or a hydrostatic pressure in corresponding actuation chambers on opposing sides of the piston. A 4/3-way pump control valve 15 selectively fluidly connects the actuation chambers of the hydraulic actuator to the pilot line 11b and to a fluid reservoir 13. The pilot line 11b may be fluidly connected to the pilot pressure port PP of the pilot pressure portion 2a by opening the start-stop valve SSV. Furthermore, the pilot line 11b is fluidly connected to a charge pump 14 which is drivingly engaged with the engine 3.

By actuating a first solenoid SPA of the pump control valve 15 the pump control valve 15 is switched to a first spool position (on the left in FIG. 3). In the first spool position, a first actuation chamber of the hydraulic actuator 12 is fluidly connected to the pilot line 11b and a second actuation chamber of the hydraulic actuator 12 is fluidly connected to the low pressure reservoir 13, thereby applying the pilot pressure provided by the pilot pressure portion 2a to the first actuation chamber of the hydraulic actuator 12. That is, in FIG. 3 the first solenoid SPA of the pump control valve 15 is actuated to swivel the swashplate of the hydrostatic pump 4 to direct flow from the second main fluid line 7b to the first main fluid line 7a. Specific details regarding a preferred opening percentage used with the hydrostatic pump 4 are dependent on several factors, which are described hereinbelow.

Figure 4:
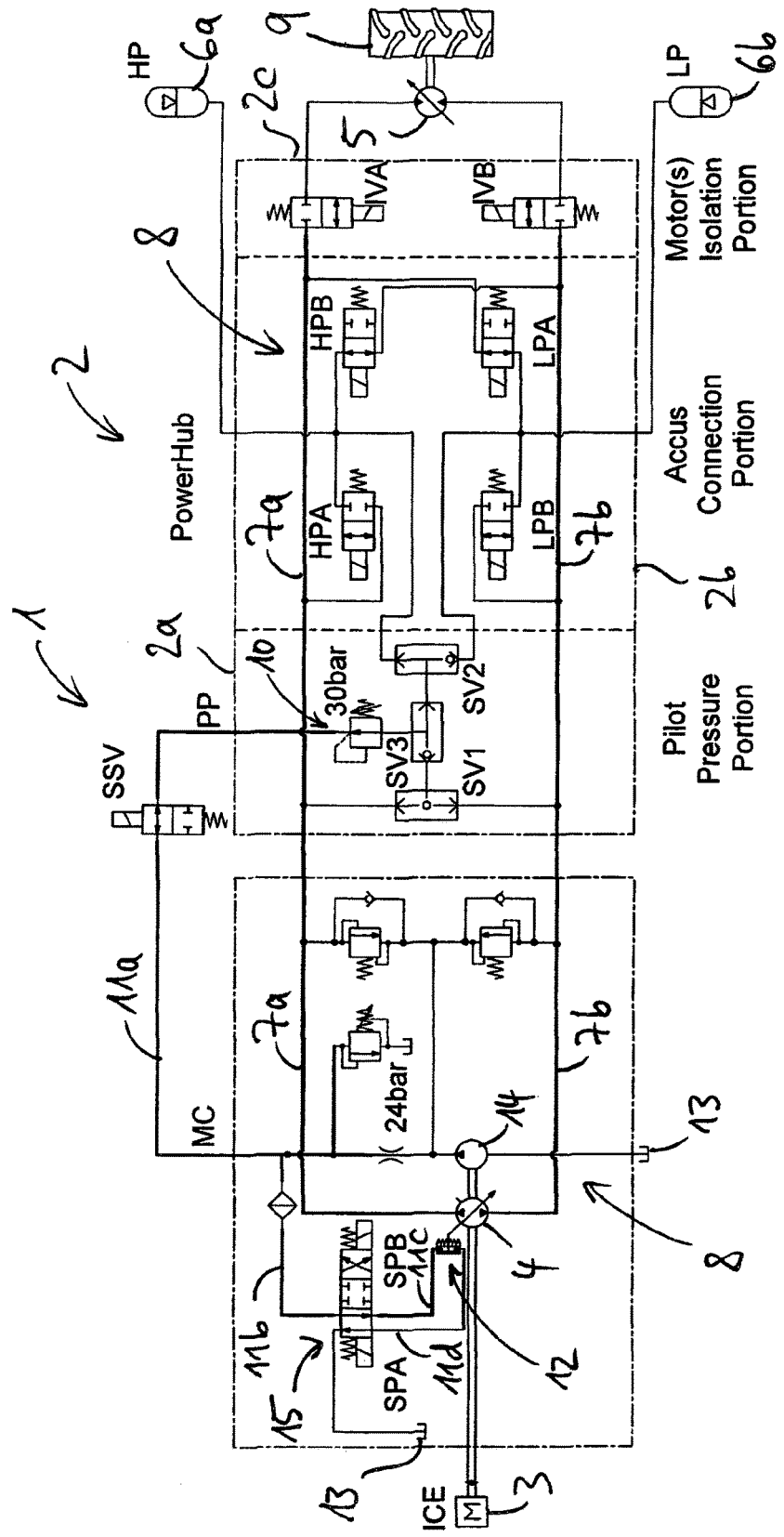
FIG. 4 shows the series hydraulic hybrid driveline of FIGS. 2 and 3, wherein the hydraulic accumulator assembly is fluidly connected to a hydrostatic pump to start an internal combustion engine drivingly engaged with the pump.

After the hydrostatic pump 4 is swiveled to reach a desired displacement, the accumulators 6a, 6b can be fluidly connected to the main fluid lines 7a, 7b, as shown in FIG. 4.

As schematically illustrated in FIG. 4, the high pressure accumulator 6a is fluidly connected to the second main fluid line 7b by actuating a high pressure accumulator valve HPB, while the low pressure accumulator 6b is fluidly connected to the first main fluid line 7a by actuating a low pressure accumulator valve LPA. In the configuration shown in FIG. 4, the swashplate of the hydrostatic pump 4 is swiveled to direct flow from the second main fluid line 7b to the first main fluid line 7a, and the hydrostatic pump 4 is subjected to a difference of pressure. As the hydrostatic motor 5 is isolated, the hydraulic hybrid driveline 1 is not driven and the hydrostatic pump 4 works as a motor, directing flow from the high pressure accumulator 6a to the low pressure accumulator 7b, and accelerating the engine 3. This configuration is maintained until the engine 3 reaches the minimum speed to enable the fuel injection process, after which the engine is placed in the operational condition.

Figure 5:
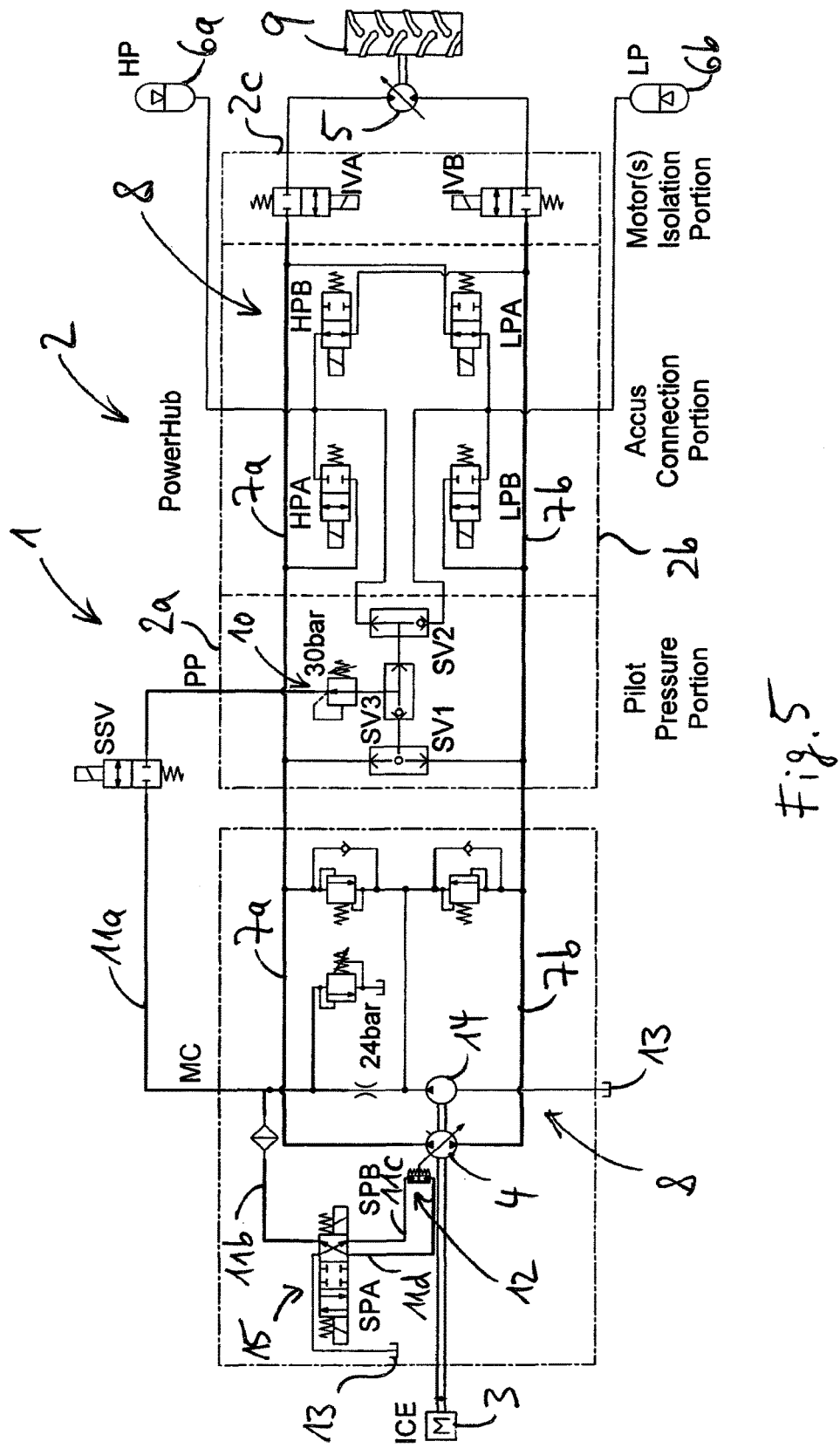
FIG. 5 shows the series hydraulic hybrid driveline of FIGS. 2 to 4, wherein a charge pump driven by the internal combustion engine provides a pilot pressure to the hydraulic actuator.

Once the engine 3 has reached the idling condition, the hydraulic hybrid driveline 1 can be operated as shown in FIG. 5, which schematically illustrates the following:

The start-stop valve SSV is switched to the closed position, as pilot pressure is now provided using a charge pump 14 drivingly engaged with the engine 3, the charge pump 14 being in fluid communication with the hydraulic actuator 12 and with the fluid reservoir 13.

A second solenoid SPB of the pump control valve 15 is actuated to move the piston of the hydraulic actuator 12 to swivel the swashplate of the hydrostatic pump 4 back to zero displacement.

Specifically, by actuating the second solenoid SPB of the pump control valve 15 the pump control valve 15 is switched to a second spool position (on the right in FIG. 5). In the second spool position, the first actuation chamber of the hydraulic actuator 12 is now fluidly connected to the low pressure reservoir 13 while the second actuation chamber of the hydraulic actuator 12 is now fluidly connected to the pressurized pilot line 11b, thereby pressurizing the second actuation chamber.

Figure 6:
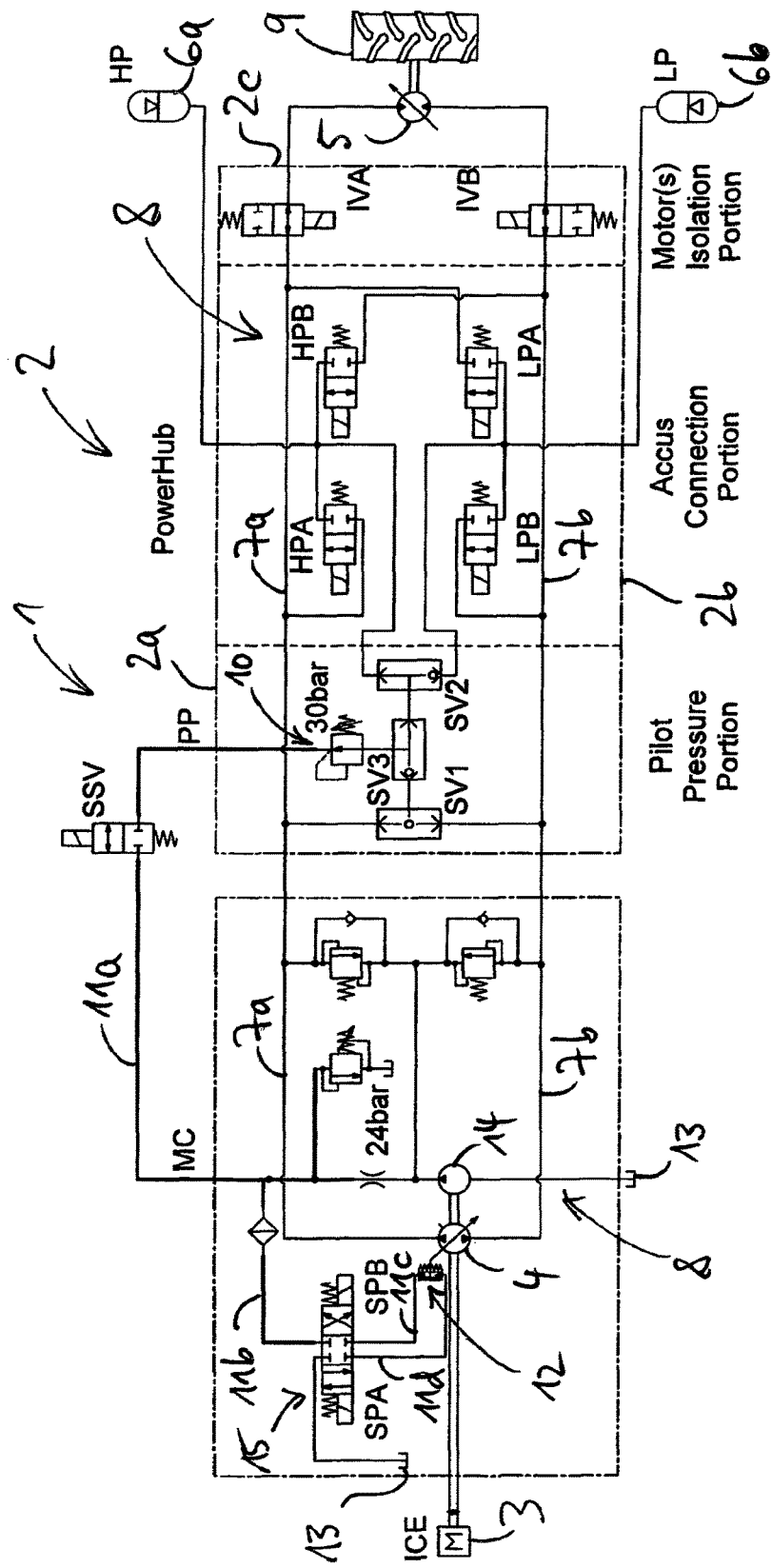
FIG. 6 the series hydraulic hybrid driveline of FIGS. 2 to 5, wherein the accumulator assembly is fluidly disconnected from the hydrostatic pump and wherein a hydrostatic motor is fluidly connected to the hydrostatic pump.

Once the swashplate of the hydrostatic pump 4 is swiveled back to zero displacement, the high pressure accumulator 6a and the low pressure accumulator 6b can be disconnected from the main fluid lines 7a, 7b without any risk of cavitation, and the pump control valve 15 (associated with the pump control valve solenoids SPA and SPB) is left in a neutral position (the center position of the pump control valve 15 in FIG. 6) in which the pump control valve solenoids SPA, SPB are not actuated. When switched to the neutral position as shown in FIG. 6, the pump control valve 15 fluidly disconnects the actuation chambers of the hydraulic actuator 12 from the low pressure reservoir 13 and from the pilot line 11b. Furthermore, even the isolation valves IVA, IVB can be actuated to fluidly connect the hydrostatic motor (or motors) 5 to the main fluid lines 7a, 7b to restore the driving condition. As schematically illustrated in FIG. 6, the main fluid lines 7a, 7b are then at a minimum system working pressure, normally imposed by a flushing of the hydrostatic motor 5.

Figure 7:
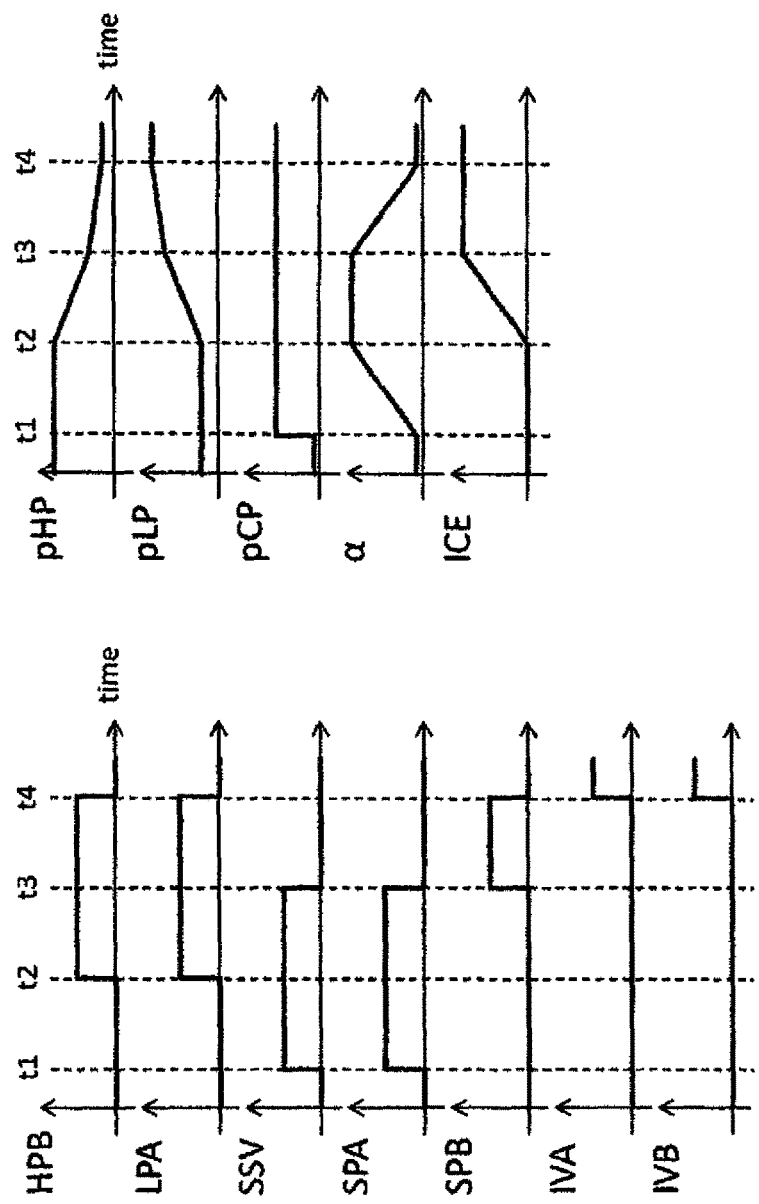
FIG. 7A shows actuations of various components of the hydraulic hybrid driveline of FIGS. 2 to 5 during the hydraulic hybrid start operation.
FIG. 7B shows the values of various system variables of the hydraulic hybrid driveline of FIGS. 2 to 5 during the hydraulic hybrid start operation.

FIG. 7A summarizes the actuations that occur during the hydraulic hybrid start operation described above, which may be characterized by four time references, t1-t4, each respectively correlating to FIGS. 3-6. A value of zero indicates a valve closure. A positive value indicates a valve opening, and a resulting effect.

The valve HPB provides fluid communication between the high pressure accumulator 6a and the second main fluid line 7b. The valve LPA provides fluid communication between the low pressure accumulator 6b and the first main fluid line 7a. The start-stop valve SSV provides fluid communication between the pilot pressure port PP and the charge pump pressure measuring port MC. The first pump control valve solenoid SPA adjusts the pump control valve 15 to supply pressure to cause the swashplate of the hydrostatic pump 4 to swivel out towards the first main fluid line 7a. The second pump control valve solenoid SPB adjusts the pump control valve to supply pressure to cause the swashplate of the hydrostatic pump 4 to swivel out towards the second main fluid line 7b. IVA fluidly disconnects the hydrostatic motor (or motors) 5 from the first main fluid line 7a. IVB fluidly disconnects the hydrostatic motor (or motors) 5 from the second main fluid line 7b.

FIG. 7B summarizes the system variables that occur during the hydraulic hybrid start operation described above, which may be characterized by the four time references, t144, each respectively correlating to FIGS. 3-6. A value of zero indicates a value of zero for the system variable. A positive value indicates an increased value for the system variable.

pHP designates a hydraulic pressure within the high pressure accumulator 6a. pLP designates a hydraulic pressure within the low pressure accumulator 6b. pCP designates a hydraulic pilot pressure supplied to the charge pump pressure measuring port MC. α designates a hydraulic displacement of the hydrostatic pump 4. ICE designates rotational speed of the engine 3.

As can be seen in FIGS. 3 and 7A, at time t1 the valves HPA, HPB, LPA, LPB are in the closed position, thereby fluidly disconnecting the accumulators 6a, 6b from the hydraulic circuit 8, and in particular from the hydrostatic pump 4. The isolation valves IVA, IVB are likewise closed, thereby fluidly disconnecting the motor 5 from the accumulators 6a, 6b and from the pump 4. The high pressure accumulator 6a is at a high pressure and the low pressure accumulator 6b is at a low pressure (see FIG. 7B). Thus, the shuttle valves SV1, SV2, SV3 select the hydraulic pressure of the high pressure accumulator 6a and the pressure reducing valve reduces this pressure to the pilot pressure pCP. By actuating the start-stop valve SSV and the first solenoid SPA of the pump control valve 15 at time t1 (see FIG. 7A) the pilot pressure pCP is supplied to the first actuation chamber of the hydraulic actuator 12 through the pilot lines 11a, 11b. This causes the piston of the hydraulic actuator 12 to gradually increase the swivel angle α of the swashplate of the pump 4 (see FIG. 7B).

At time t2, when the hydraulic displacement of the pump 4 has reached a desired non-zero value (see FIG. 7B), the valves HPB, LPA are actuated to fluidly connect the accumulators 6a, 6b to the main fluid lines 7b, 7a, respectively, and to the fluid ports of the pump 4 (see FIGS. 4 and 7A). As a result, fluid from the high pressure accumulator 6a is displaced to the low pressure accumulator 6b through the pump 4, thereby driving the pump 4 and gradually increasing the rotational speed of the engine 3 (see FIG. 7B). In the course of this process, the accumulators 6a, 6b are gradually discharged. That is, the hydraulic pressure in the high pressure accumulator 6a is gradually decreased and the hydraulic pressure in the low pressure accumulator 6b is gradually increased (see FIG. 7B).

At time t3, when the rotational speed ICE of the engine 3 has reached an idling speed (see FIG. 7B), the second solenoid SPB of the pump control valve 15 is actuated (see FIGS. 5 and 7A) to switch the pump control valve 15 to the second position and to swivel the swashplate of the pump 4 back to zero displacement (see FIG. 7B). Swiveling the swashplate back to zero displacement is intended to avoid cavitation in the pump 4 during the subsequent disconnection of the accumulators 6a, 6b from the hydraulic circuit 8 at time t4 (see below). Fuel injection and ignition in the engine 3 may be initiated at time t3. The pilot pressure needed for swiveling the swashplate back to zero displacement between times t3 and t4 is provided by the charge pump 14 which is now driven by the engine 3 and which is fluidly connected to the hydraulic actuator 12 through the pilot lines 11b, 11c (see FIG. 5). Therefore, the fluid connection between the pilot pressure port PP and the hydraulic actuator 12 may be interrupted at time t3 by closing the start-stop valve SSV (see FIGS. 5 and 7A). Due to the gradual decrease of the hydraulic displacement a of the pump 4 between times t3 and t4, the rate at which the accumulators 6a, 6b discharge slightly decreases between times t3 and t4 (see FIG. 7B).

At time t4, when the hydraulic displacement a has been set to zero (see FIG. 7B), the accumulators 6a, 6b are fluidly disconnected from the hydraulic circuit 8 by closing the valves HPB, LPA (see FIGS. 6 and 7A). Also, the isolation valves IVA, IVB are opened at time t4 to fluidly connect the motor 5 to the pump 4, thereby allowing mechanical energy from the engine 3 to be transmitted to the vehicle output 9 through the hydraulic circuit 8.

It is important to mention that an optimized swiveling angle for the hydrostatic pump 4 depends on several factors. A trend should be to maximize the swiveling angle $\alpha_{pump}$ to maximize a torque T of the hydrostatic pump 4, but it depends also on a state of charge of the high pressure accumulator 6a and the low pressure accumulator 6b according to the equation: $T \sim \alpha_{pump} \cdot (p_{Hp} - p_{LP})$, where "~" denotes "proportional." Furthermore, the timings t2, t3 and t4 depend on some factors, such as the state of charge of the high pressure accumulator 6a and the low pressure accumulator 6b, an inertia of the engine 3, a resistance of the engine 3, an efficiency of the pump 4, among others.

The method and apparatus described hereinabove details how to stop and re-start the engine using energy stored in the high pressure accumulator 6a and the low pressure accumulator 6b. In addition to the method that has been described hereinabove, a plurality of conditions, which are described hereinbelow, are employed when determining how and when the engine 3 can be stopped and re-started.

The engine 3 can be stopped based on the following conditions:

Stopping the engine 3 may be based on input from the operator, which may be measured through the use of a steering wheel, at least one pedal, at least one joystick, at least one lever, and at least one button, among other input sources. A time based rationale can be employed to determine that the engine 3 may be stopped. A non-limiting example of the time based rationale is if the engine 3 is in the idling condition and there are no commands from the operator for a given amount of time, the engine 3 can be stopped.

Additionally or alternatively, the engine 3 may be stopped based on a state of charge of the accumulators 6a, 6b. It has been discussed hereinabove that, following the braking maneuver, the high pressure accumulator 6a is charged while the low pressure accumulator 6b is at a minimum pressure, which is slightly greater than a pre-charge pressure. However, this may not always be the case, as it depends on the energy available at the beginning of the braking maneuver (which is based on at least a kinetic energy of the vehicle and an amount of energy stored in the accumulators 6a, 6b). As a result, the engine 3 can be stopped only when there is enough energy stored in the accumulators 6a, 6b to re-start the engine. Further, if the condition on the inputs from the operator is satisfied but the state of charge of the accumulators 6a, 6b is too low, the engine 3 and the hydrostatic pump 4 may be employed to store energy in the accumulators 6a, 6b. Following such a process, the state of charge condition for the accumulators 6a, 6b is satisfied and the engine 3 can be shut down.

Figure 8:
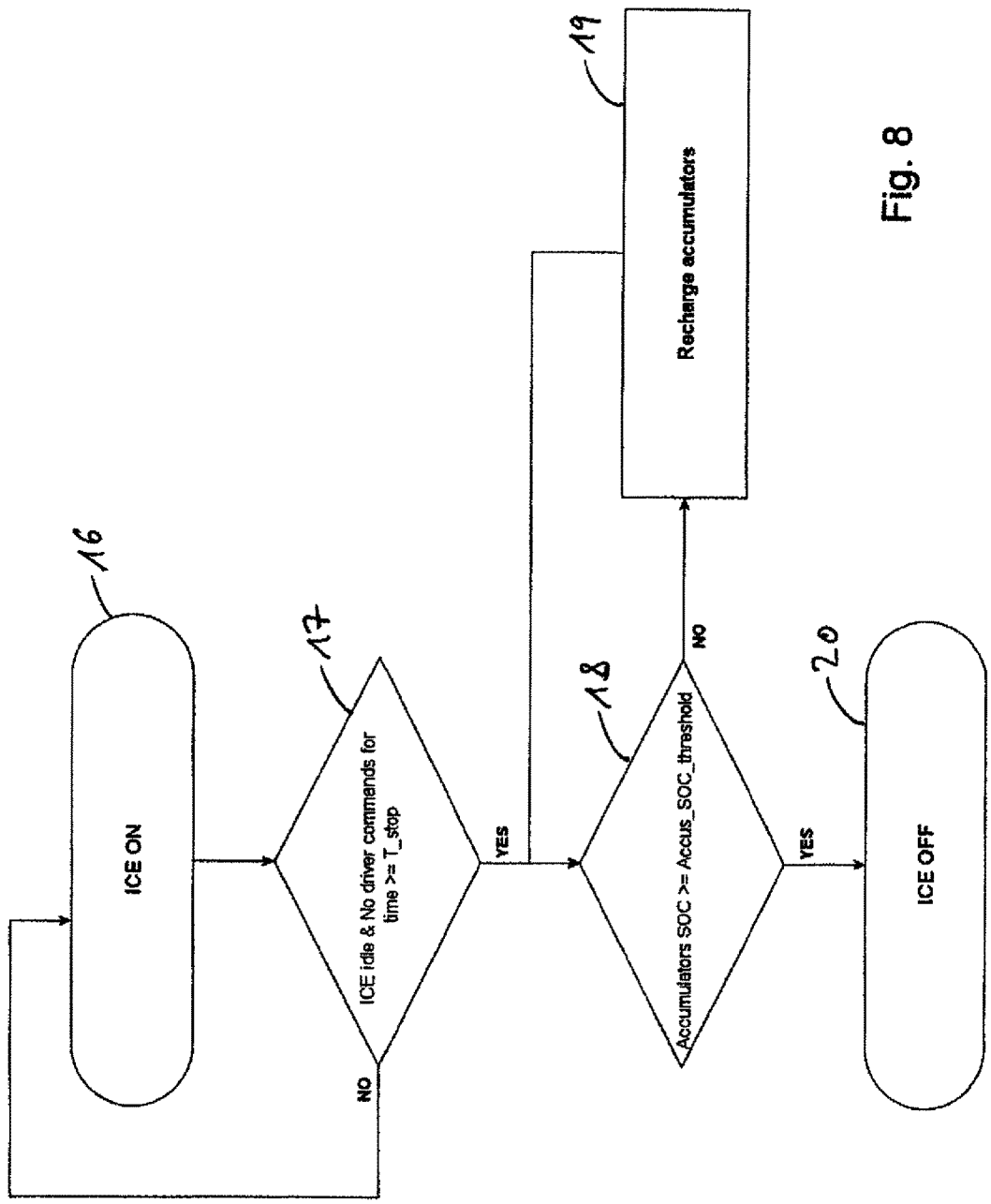
FIG. 8 shows steps of a method of shutting down the internal combustion engine of the hydraulic hybrid driveline of FIGS. 2 to 5.

The above described rationale for the shut down of the engine is schematically illustrated in FIG. 8. At 16 in FIG. 8, the engine 3 is on, for example in an idling condition. At 17, if the engine 3 has been in the idling condition for a period of time $T_{stop}$ and if the operator has provided no input for the period of time $T_{stop}$, the method proceeds to 18. At 18, a state of charge of the accumulators 6a, 6b is determined. Specifically, it is determined whether the state of charge of the accumulators 6a, 6b is equal to or above a threshold state of charge that is required to restart the engine using the hydraulic energy stored in the accumulators 6a, 6b as described above. If it is found that the state of charge of the accumulators 6a, 6b is below the threshold state of charge, the method proceeds to 19. At 19, the accumulators 6a, 6b are charged. That is, the engine 3 drives the pump 4 to displace hydraulic fluid from the low pressure accumulator 6b to the high pressure accumulator 6a until the state of charge of the accumulators 6a, 6b is equal to or above the threshold state of charge. Once the state of charge of the accumulators 6a, 6b is equal to or above the threshold state of charge, the method proceeds to 20 where the engine 3 is shut down.

The engine 3 is re-started based on the occurrence of one of the following two conditions:

Input from the operator: If the operator provides any input to the system, the procedure must be performed to re-start the engine 3

The state of charge of an electric battery—If the state of charge of the electric battery gets close to a minimum threshold (such as a result of use of a plurality of lights or sensors of the vehicle, among other uses) to guarantee all the actuations needed for the re-start procedure, the re-start procedure is initiated automatically.

Figure 9:
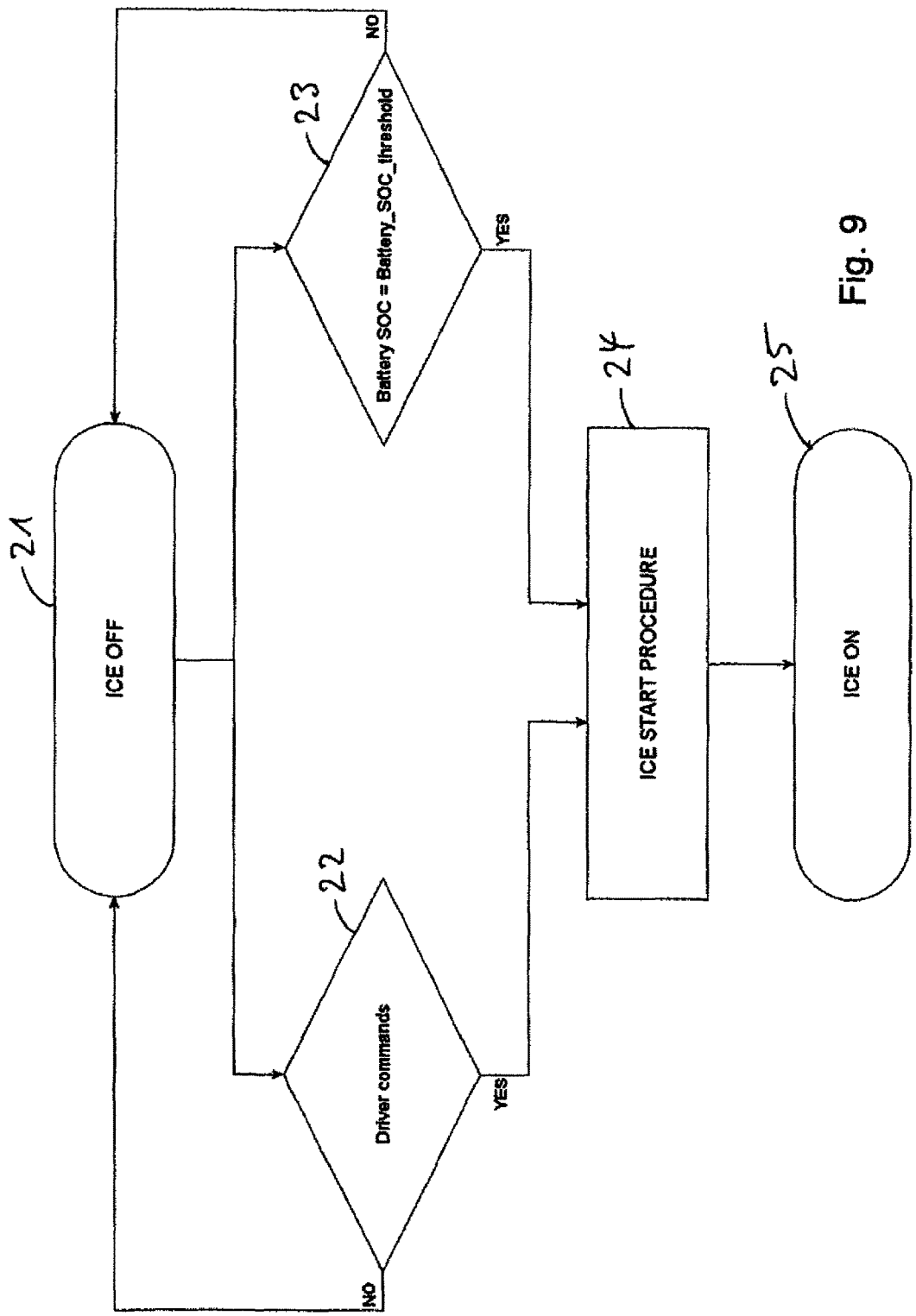
FIG. 9 shows steps of a method of re-starting the internal combustion engine of the hydraulic hybrid driveline of FIGS. 2 to 5.

The above described rationale for the re-start of the engine is schematically illustrated in FIG. 9. At 21 in FIG. 9 the engine 3 is turned off. While the engine 3 is turned off one or more input devices and a state of charge of a battery are monitored. If, at 22, an operator provides an input through at least one of the input devices, or if, at 23, the state of charge of the battery reaches a threshold value or falls below the threshold value, the method of starting the engine 3 described above with respect to FIGS. 1-7 is initiated at 24 until, at 25, the engine 3 is turned on.

The system can also be implemented in a reverse configuration, for example through inverting the main fluid lines 7a and 7b and corresponding commands to the pump control valve and the valves associated with the accumulators 6a, 6b.

The concepts described herein can be applied to an electro-hydraulic piloted pump with pressure feedback or to a hydraulically piloted pump (having fully hydraulic control or automotive control) by the introduction and control of additional on/off and by-pass valves.

The concepts described herein can be applied without the motor isolation portion 2c of the powerhub 2. In order to brake the vehicle during the engine starting sequence it would be required to have a normally closed hydrostatic motor (or motors) 5 or to command the motor 5 to a zero displacement position, and/or to mechanically brake the vehicle.

The torque modulation which is discussed hereinabove can be achieved by introducing a proportional valve between the high pressure accumulator and the main fluid lines 7a, 7b, to reduce the flow from the high pressure accumulator 6a, and by swiveling the hydrostatic pump 4 to a maximum displacement.

The invention claimed is:

1. A series hydraulic hybrid driveline for a vehicle, comprising:
    a hydraulic circuit comprising a first hydraulic displacement unit in fluid communication with a second hydraulic displacement unit, the first hydraulic displacement unit having a variable hydraulic displacement and the first hydraulic displacement unit being drivingly engaged with an internal combustion engine;
    a hydraulic accumulator assembly selectively fluidly connected to the hydraulic circuit, the hydraulic accumulator assembly comprising a high pressure hydraulic accumulator and a low pressure hydraulic accumulator; and
    a hydraulic actuator adapted to control the hydraulic displacement of the first hydraulic displacement unit, the hydraulic actuator being in fluid communication with the hydraulic accumulator assembly and with the hydraulic circuit;
    wherein the hydraulic actuator is in fluid communication with the hydraulic accumulator assembly and with the hydraulic circuit through a pilot pressure portion, the pilot pressure portion comprising shuttle valves adapted to select a greatest hydraulic pressure between a greatest hydraulic pressure in the hydraulic circuit and a greatest hydraulic pressure in the hydraulic accumulator assembly.

2. The series hydraulic hybrid driveline of claim 1, the pilot pressure portion further comprising a pressure reducing valve adapted to reduce the greatest pressure selected by the shuttle valves to a pilot pressure, the pressure reducing valve being fluidly connected or selectively fluidly connected to the hydraulic actuator for providing or selectively providing the pilot pressure to the hydraulic actuator.

3. The series hydraulic hybrid driveline of claim 2, wherein the hydraulic circuit comprises a first main fluid line fluidly connecting or selectively fluidly connecting a first fluid port of the first hydraulic displacement unit to a first fluid port of the second hydraulic displacement unit and wherein the hydraulic circuit comprises a second main fluid line fluidly connecting or selectively fluidly connecting a second fluid port of the first hydraulic displacement unit to a second fluid port of the second hydraulic displacement unit, and wherein the pilot pressure portion comprises a first shuttle valve adapted to select a greater hydraulic pressure between the hydraulic pressure in the first main fluid line and in the second main fluid line.

4. The series hydraulic hybrid driveline of claim 3, wherein the pilot pressure portion comprises a second shuttle valve adapted to select a greater hydraulic pressure between the hydraulic pressure in the high pressure hydraulic accumulator and in the low pressure hydraulic accumulator.

5. The series hydraulic hybrid driveline of claim 4, wherein the pilot pressure portion comprises a third shuttle valve adapted to select a greater hydraulic pressure between the hydraulic pressure selected by the first shuttle valve and the hydraulic pressure selected by the second shuttle valve.

6. The series hydraulic hybrid driveline of claim 5, further comprising a charge pump drivingly engaged with the internal combustion engine, the charge pump being in fluid communication with the hydraulic actuator for providing or for selectively providing a pilot pressure to the hydraulic actuator when the internal combustion engine is driving the charge pump.

7. The series hydraulic hybrid driveline of claim 6, further comprising a pair of isolation valves adapted to selectively fluidly disconnect the second hydraulic displacement unit from at least one of (i) the first hydraulic displacement unit, and (ii) the hydraulic accumulator assembly when the hydraulic accumulator assembly is fluidly connected to the hydraulic circuit.

* * * * *